UNITED STATES PATENT OFFICE.

WILHELM HASENBACH, OF MANNHEIM, GERMANY.

PROCESS OF MAKING SODIUM THIOSULFATE.

No. 903,135.  Specification of Letters Patent.  Patented Nov. 3, 1908.

Original application filed November 1, 1907, Serial No. 400,207. Divided and this application filed March 10, 1908. Serial No. 420,202.

*To all whom it may concern:*

Be it known that I, WILHELM HASENBACH, a subject of the German Emperor, and residing at Mannheim, Germany, have invented certain new and useful Improvements in Processes of Making Sodium Thiosulfate, of which the following is a specification.

This invention consists in a process of manufacturing solid pulverulent thiosulfate free from water.

The process consists in passing atmospheric air (oxygen) at a high temperature over solid pulverulent sodium hydrosulfid free from water, when the oxygen is absorbed and thiosulfate formed in accordance with the equation

$$2NaHS + 4O = Na_2S_2O_3 + H_2O.$$

It is advantageous to pass the air over the material at a temperature of 100° centigrade to begin with, and then to raise the temperature to about 150° centigrade. A dry, easily friable product is thus prepared which contains a high percentage of sodium thiosulfate free from water which can in many cases be applied in the form in which it was obtained the impurities with which it is mixed (chiefly finely divided coal) can be removed by dissolution at the place of its application. By this means, a great reduction in freight is secured as there is no water of crystallization to be transported.

If crystalline thio-sulfate is to be obtained from the reaction product, it is possible, as the product obtained contains a large amount of sodium thio-sulfate free from water, to obtain by dissolving the said product in hot water, a lye of such concentration as will be suitable for crystallization. This mode of proceeding has therefore very important advantages over the known processes in which lyes of considerably lower concentration are obtained which requires a large amount of evaporation.

The reaction also takes place when a mixture of sulfureted hydrogen and oxygen in the required proportions is passed over solid, pulverulent sodium-sulfid at a high temperature, but in such case pure reaction products are not obtained.

I claim:—

The herein described process of manufacturing pulverulent sodium thiosulfate free from water consisting in passing oxygen in the form of atmospheric air at a temperature of about 100 to 150° C. over pulverized sodium hydrosulfid free from water.

In testimony whereof I have signed my name to this specification in the presence of two subscribing witnesses.

WILHELM HASENBACH.

Witnesses:
 ALBERT SCHÛLE,
 JOS. H. LEUTE.